(12) United States Patent
Suzuki et al.

(10) Patent No.: US 11,958,475 B2
(45) Date of Patent: *Apr. 16, 2024

(54) PARKING ASSIST METHOD AND PARKING ASSIST DEVICE

(71) Applicant: Nissan Motor Co., Ltd., Yokohama (JP)

(72) Inventors: Yasuhiro Suzuki, Kanagawa (JP); Yusuke Hirano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 124 days.

This patent is subject to a terminal disclaimer.

(21) Appl. No.: 17/640,258

(22) PCT Filed: Sep. 6, 2019

(86) PCT No.: PCT/JP2019/035199
§ 371 (c)(1),
(2) Date: Mar. 3, 2022

(87) PCT Pub. No.: WO2021/044616
PCT Pub. Date: Mar. 11, 2021

(65) Prior Publication Data
US 2022/0332308 A1   Oct. 20, 2022

(51) Int. Cl.
*B60W 30/06* (2006.01)
*B60K 35/00* (2024.01)
(Continued)

(52) U.S. Cl.
CPC .......... *B60W 30/06* (2013.01); *B60K 35/00* (2013.01); *G05D 1/0061* (2013.01); *G08G 1/143* (2013.01);
(Continued)

(58) Field of Classification Search
CPC . B60W 30/06; B62D 15/0285; B62D 15/028; B62D 15/027; G08G 1/168; G06V 20/586
See application file for complete search history.

(56) References Cited

U.S. PATENT DOCUMENTS

2005/0027414 A1   2/2005   Iwazaki et al.
2010/0219010 A1*  9/2010   Kadowaki .......... B62D 15/0285
                                                       701/25
(Continued)

FOREIGN PATENT DOCUMENTS

JP   2003-237511 A   8/2003
JP   2005-014778 A   1/2005
(Continued)

*Primary Examiner* — Mirza F Alam
(74) *Attorney, Agent, or Firm* — Young Basile Hanlon & MacFarlane, P.C.

(57) ABSTRACT

A parking assist method uses a parking assist device which includes a controller configured to, when a subject vehicle travels by manual driving of a driver, determine whether or not the subject vehicle can be parked in a target parking space from a current position by first parking control for parking the subject vehicle by moving the subject vehicle only backward, and when it is determined that the subject vehicle can be parked in the target parking space by the first parking control, enable acceptance of a selection of the driver to execute the first parking control.

22 Claims, 12 Drawing Sheets

(51) Int. Cl.
*G05D 1/00* (2006.01)
*G08G 1/14* (2006.01)
*B60K 35/28* (2024.01)
*B60K 35/29* (2024.01)

(52) U.S. Cl.
CPC .............. *B60K 35/28* (2024.01); *B60K 35/29* (2024.01); *B60K 2360/166* (2024.01); *B60K 2360/175* (2024.01); *B60K 2360/188* (2024.01)

(56) References Cited

U.S. PATENT DOCUMENTS

| | | | |
|---|---|---|---|
| 2011/0298639 | A1 | 12/2011 | Kadowaki |
| 2015/0039173 | A1* | 2/2015 | Beaurepaire .......... B60W 30/06 |
| | | | 701/23 |
| 2019/0225267 | A1 | 7/2019 | Ohtani et al. |
| 2019/0375450 | A1* | 12/2019 | Medagoda ......... B62D 15/0285 |
| 2020/0249679 | A1* | 8/2020 | Hasejima ............. G05D 1/0212 |
| 2021/0179087 | A1* | 6/2021 | Tsujino .................. G08G 1/168 |

FOREIGN PATENT DOCUMENTS

| | | | |
|---|---|---|---|
| JP | 2006-008009 | A | 1/2006 |
| JP | 2013-043505 | A | 3/2013 |
| JP | 2014-004930 | A | 1/2014 |
| JP | 2019-119234 | A | 7/2019 |
| JP | 2019-128643 | A | 8/2019 |
| RU | 2529078 | C2 | 9/2014 |
| WO | 2012/143033 | A1 | 10/2012 |
| WO | 2019/065180 | A1 | 4/2019 |

* cited by examiner

FIG. 4
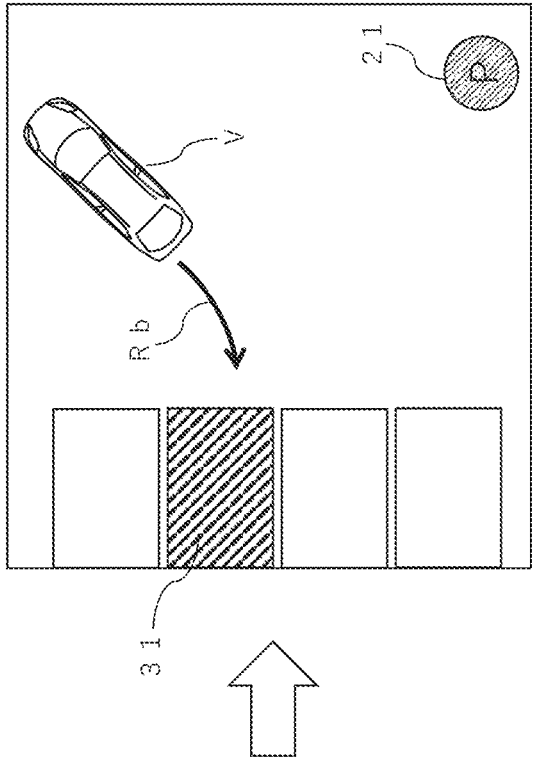
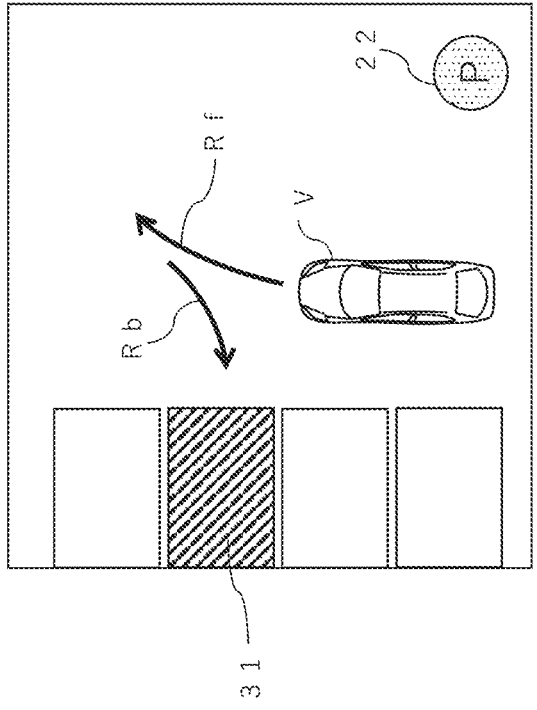

FIG. 6
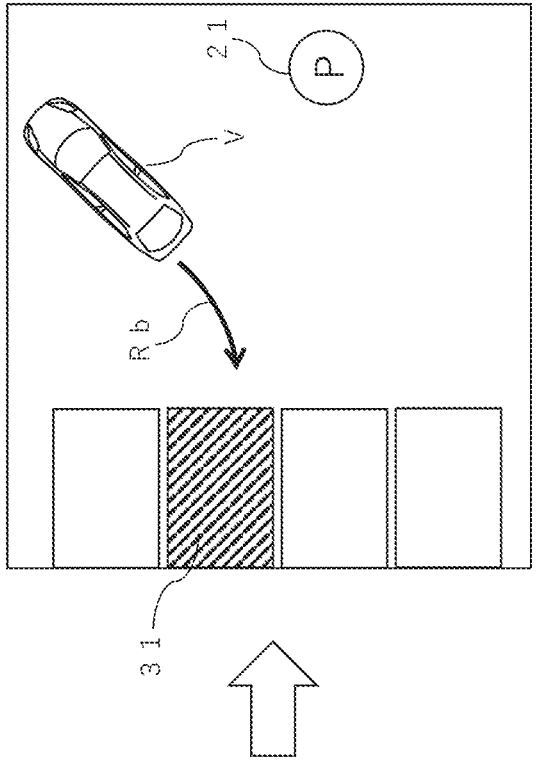
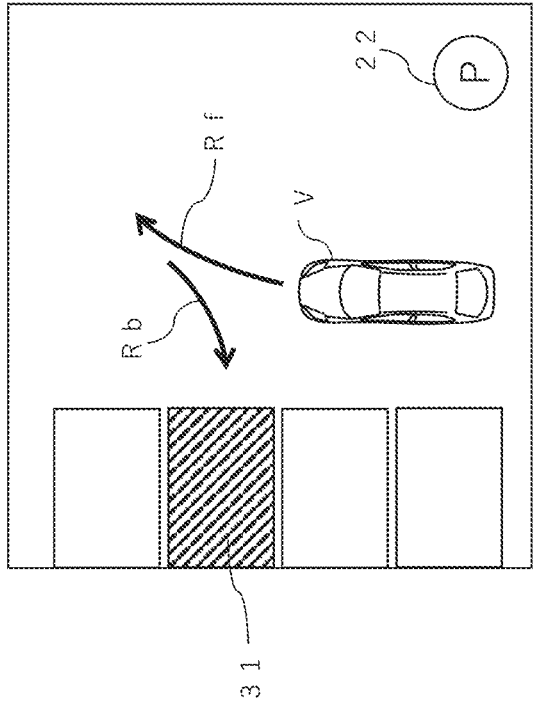

FIG. 8
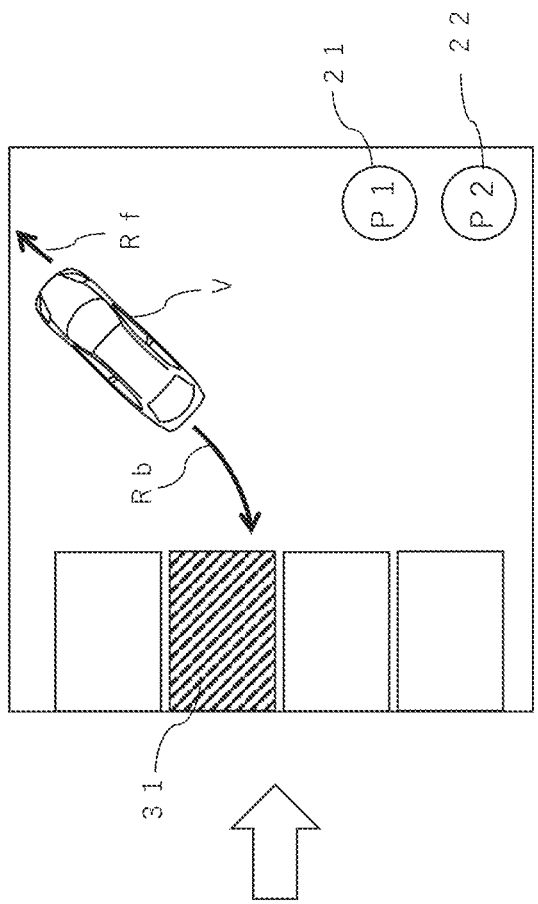
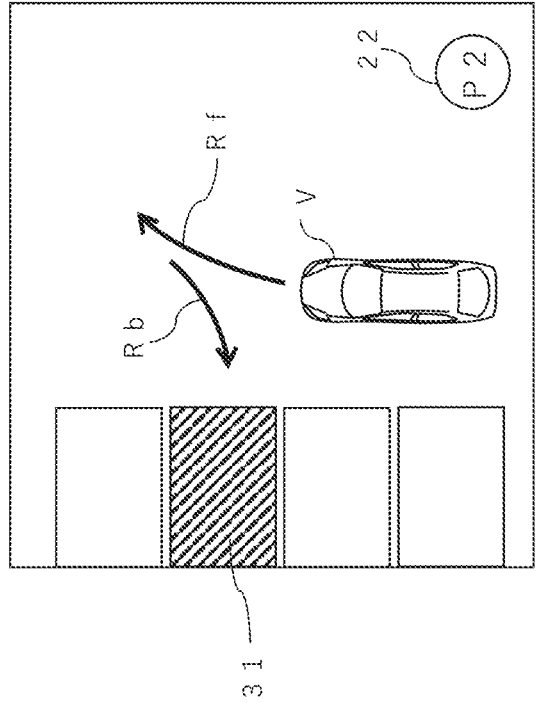

PARKING ASSIST METHOD AND PARKING ASSIST DEVICE

TECHNICAL FIELD

The present invention relates to a parking assist method and a parking assist device for assisting parking of a subject vehicle.

BACKGROUND

A parking assist system described in International Publication No. 2012/143033 selects the most favorable parking space for the subject vehicle from a plurality of parking spaces. The parking assist system then assists the parking of the subject vehicle by executing an autonomous parking function for a period from the beginning of a parking motion of the subject vehicle to the completion of the parking so that the subject vehicle can be parked in the selected parking space.

SUMMARY

Although the parking assist system of International Publication No. 2012/143033 compares time required for parking on the basis of a parking trajectory to each of the plurality of parking spaces and highlights the parking space that requires shorter time for parking, it does not consider that the parking motion included in the parking control greatly affects the time required for parking. The parking assist system of International Publication No. 2012/143033 does not detect whether the target parking space is a parking space that requires to move the subject vehicle forward and backward for parking or a parking space that requires to move the subject vehicle only backward for the same. As a result, the unnecessary parking motion is included in the parking control, and the time required for parking may be prolonged.

A problem to be solved by the present invention is to provide a parking assist method and a parking assist device that can omit that the subject vehicle is unnecessarily moved forward and suppress that the time required for parking is prolonged by determining whether or not the target parking space is a parking space in which the subject vehicle can be parked by moving the subject vehicle only backward.

The parking assist method and the parking assist device of the present invention solve the above problem by enabling acceptance of execution of first parking control for parking the subject vehicle in the target parking space by moving the subject vehicle only backward, when it is determined that the subject vehicle can be parked in the target parking space by moving the subject vehicle only backward.

According to the present invention, since the parking assist device can accept the parking control for moving the subject vehicle only backward when the parking control for moving the subject vehicle only backward can be executed relative to the target parking space, it is possible to omit that the subject vehicle is unnecessary moved forward and suppress that the time required for parking is prolonged.

BRIEF DESCRIPTION OF THE DRAWINGS

FIG. 4 is a diagram illustrating a screen for presenting first guidance information (the right side) and a screen for presenting second guidance information (the left side) in the parking assist method illustrated in FIG. 2;

FIG. 6 is a diagram illustrating a screen for presenting the first guidance information (the right side) and the screen for presenting the second guidance information (the left side) in the parking assist method illustrated in FIG. 2 and illustrating another example of the form of display of the first guidance information and the second guidance information;

FIG. 8 is a diagram illustrating the screen for presenting both of the first guidance information and the second guidance information (the right side) and the screen for presenting the second guidance information (the left side) in the parking assist method illustrated in FIG. 7;

DETAILED DESCRIPTION

Hereinafter, embodiments of the present invention will be described with reference to the drawings.

First Embodiment

The parking assist device 100 and the parking assist method using the parking assist device 100 according to the first embodiment of the present invention will be explained on the basis of FIG. 1 to FIG. 5.

First, the configuration of the parking assist device 100 mounted on the vehicle will be explained using FIG. 1. The parking assist device 100 comprises a controller 15 for controlling execution of processes of a parking assist. The controller 15 of the parking assist device 100 comprises one or more computers and executes software installed in the computers. The controller 15 of the parking assist device 100 includes a ROM that stores a control program for autonomously operate the subject vehicle to park it at a set target parking position, a CPU that executes the program stored in the ROM, and a RAM that functions as an accessible storage device. The controller 15 executes the parking assist for parking the subject vehicle in the target parking space, that is, a parking space set as a target. Further, the controller 15 executes the parking assist of the subject vehicle by either first parking control for parking the subject vehicle in the target parking space by moving the subject vehicle only backward or second parking control for parking the subject vehicle in the target parking space by moving the subject vehicle forward and backward.

Figure 1:
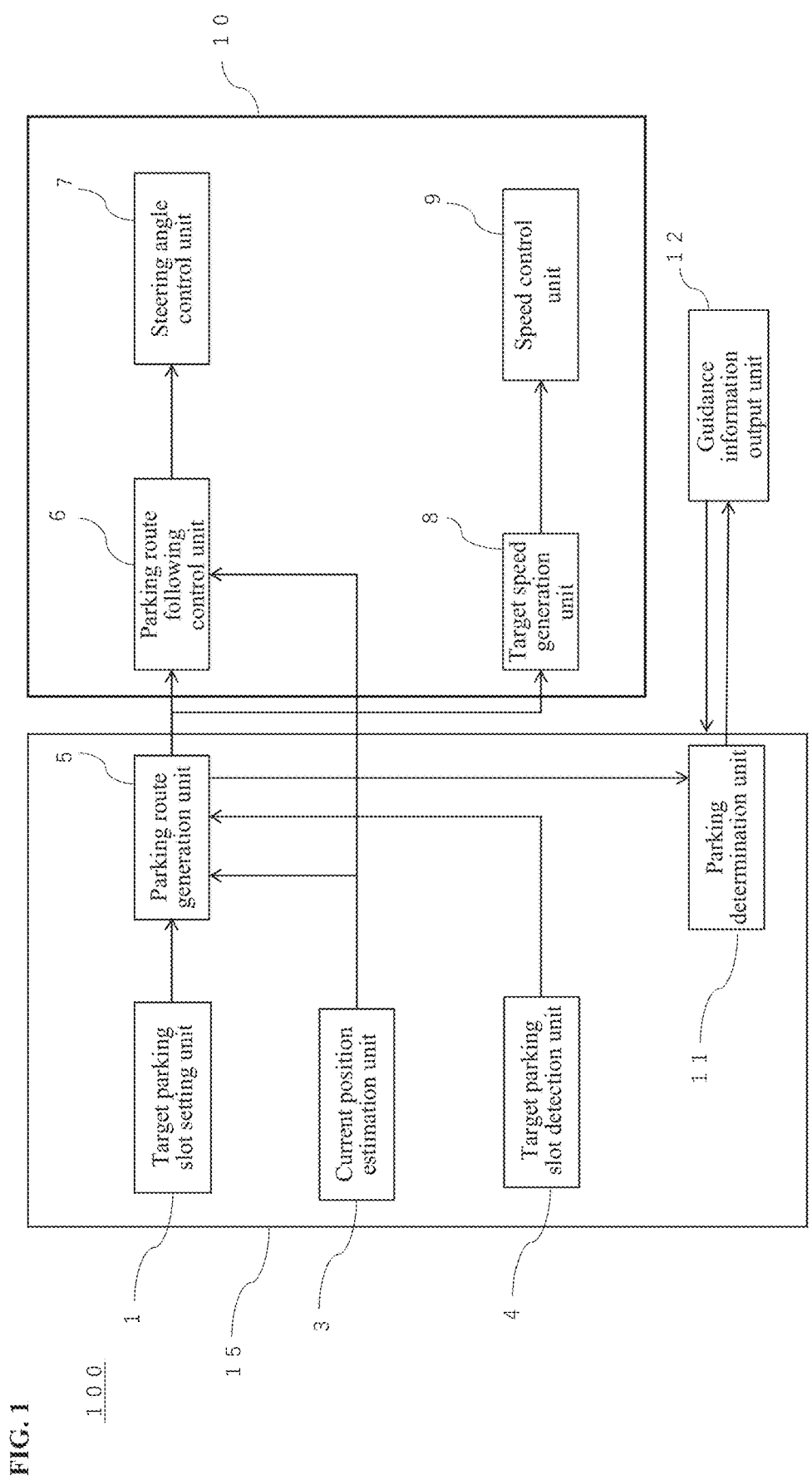
FIG. 1 is a block diagram illustrating a configuration of the parking assist device according to an embodiment of the present invention.

As illustrated in FIG. 1, the parking assist device 100 comprises an autonomous parking control unit 10 and a guidance information output unit 12, together with the controller 15. The controller 15 comprises a target parking slot setting unit 1, a current position estimation unit 3, a target parking slot detection unit 4, a parking route generation unit 5, the autonomous parking control unit 10 and a parking determination unit 11. The target parking slot setting unit 1, the current position estimation unit 3, the target parking slot detection unit 4, the parking route generation unit 5, the parking determination unit 11, and the guidance information output unit 12 execute their respective functions, regardless of whether a parking mode of the subject vehicle is an autonomous mode or a manual mode.

The autonomous parking control unit 10 executes an autonomous parking function while the parking mode of the subject vehicle is the autonomous mode to control a steering actuator and an acceleration actuator of the subject vehicle. The autonomous parking control unit 10 comprises a parking route following control unit 6, a steering angle control unit 7, a target speed generation unit 8, and a speed control unit 9. The autonomous parking control unit 10 can execute, according to a command of the controller 15, control of either the first parking control for parking the subject vehicle in the target parking space by moving the subject vehicle only backward or the second parking control for parking the subject vehicle in the target parking space by moving the subject vehicle forward and backward. The autonomous parking control unit 10 normally executes the parking assist by the second parking control and executes the parking assist by the first parking control only when the first parking control is selected by the driver and the execution thereof is instructed via the controller 15.

The target parking slot setting unit 1 searches for a parking slot existing around the subject vehicle. The parking slot is composed of lines marking off the parking slot, such as white lines, and defines the parking space. When a plurality of parking slots is detected, the target parking slot setting unit 1 has the driver to select the desired parking slot from the parking slots where the subject vehicle can be parked, and outputs positional information of the selected target parking slot (e.g., a coordination of a relative position from the current position of the subject vehicle, latitude, longitude) to the parking route generation unit 5. Alternatively, the target parking slot setting unit 1 may autonomously set a target slot regardless of the selection of the driver. An area inside the target parking slot is set as the target parking space.

The current position estimation unit 3 comprises a GPS unit, a gyro sensor, and a vehicle speed sensor and the like. The current position estimation unit 3 detects radio waves transmitted from a plurality of satellite communications with the GPS unit and periodically acquires the positional information of the subject vehicle. Then, the current position estimation unit 3 estimates the current position of the subject vehicle on the basis of the acquired positional information of the subject vehicle, angle change information acquired from the gyro sensor, and vehicle speed acquired from the vehicle speed sensor. The positional information of the subject vehicle estimated by the current position estimation unit 3 is output to the parking route generation unit 5 and the parking route following control unit 6 of the autonomous parking control unit 10 at a predetermined time interval.

The target parking slot detection unit 4 comprises a plurality of cameras, sonars, or radars that capture the surroundings of the subject vehicle. The target parking slot detection unit 4 detects the target parking slot set by the target parking slot setting unit 1 and outputs information such as a shape and a size of the target parking slot to the parking route generation unit 5 and the parking determination unit 11.

The parking route generation unit 5 generates a parking route from the current position to the target parking space on the basis of properties of the subject vehicle (e.g., sizes such as a width and a length of the vehicle and minimum turning radius) stored in advance, information of the target parking slot (the target parking space) acquired from the target parking slot setting unit 1 and the target parking slot detection unit 4, and information of the current position estimated by the current position estimation unit 3. The parking route generation unit 5 outputs the information of the parking route to the parking route following control unit 6 and the target speed generation unit 8 of the autonomous parking control unit 10 and the parking determination unit 11.

The parking determination unit 11 determines whether or not the subject vehicle can be parked in the target parking space by the first parking control for moving the subject vehicle only backward on the basis of the information of the parking route generated by the parking route generation unit 5. When the parking route generated by the parking route generation unit 5 includes a trajectory for performing one or more times of cutting of the wheel, the subject vehicle is parked in the target parking space by the second parking control for moving the subject vehicle forward and backward. In such a case, since the subject vehicle cannot be parked in the target parking space by the first parking control for moving the subject vehicle only backward, the parking determination unit 11 determines that the subject vehicle "cannot be parked in the target parking space from the current position by the first parking control". The parking determination unit 11 outputs a determination result to the guidance information output unit 12.

The guidance information output unit 12 is a user interface for outputting information used for driving of the driver, such as information of the current position of the subject vehicle, information on vehicle conditions, traffic information, and the like. The guidance information output unit 12 is, for example, a display comprising a touch screen that can display the guidance information on a navigation screen and to which the driver can input various instructions and selections by touching the screen to perform an operation. When the parking determination unit 11 determines that the subject vehicle can be parked in the target parking space by the first parking control, the guidance information output unit 12 presents the guidance information to an occupant of the subject vehicle, the guidance information indicating that execution of the first parking control can be selected and the instruction to execute the selected control can be accepted.

The parking route following control unit 6 of the autonomous parking control unit 10 calculates a target steering angle for the subject vehicle to follow the parking route on the basis of the information of the parking route acquired from the parking route generation unit 5 and the current position of the subject vehicle acquired from the current position estimation unit 3. The parking route following control unit 6 calculates the target steering angle according to the current position of the subject vehicle at a predetermined time interval and outputs it to the steering angle control unit 7. The steering angle control unit 7 generates a control signal for controlling the steering actuator of the subject vehicle on the basis of the target steering angle acquired from the parking route following control unit 6.

The target speed generation unit 8 of the autonomous parking control unit 10 calculates target vehicle speed for the subject vehicle to follow the parking route on the basis of the information of the parking route acquired from the parking route generation unit 5, and outputs it to the speed control unit 9. The speed control unit 9 generates a control signal for controlling the acceleration actuator of the subject vehicle on the basis of the target vehicle speed acquired from the target speed generation unit 8.

The control of the steering actuator by the steering angle control unit 7 and the control of the acceleration actuator by the speed control unit 9 are performed simultaneously, so that the subject vehicle is operated autonomously and guided to park in the set target parking position.

The autonomous parking control unit 10 executes the first parking control when the execution of the first parking control is selected on the basis of the guidance information presented on the guidance information output unit 12, that is, when the driver inputs an instruction to switch the parking mode of the subject vehicle from the manual mode to the autonomous mode to the guidance information output unit 12 and the driver selects the execution of the first parking control and inputs the instruction to execute the first parking control to the controller 15. The autonomous parking control unit 10 executes the second parking control when the driver does not select the execution of the first parking control or when the driver selects the execution of the second parking control in the case where the driver inputs the instruction to switch the parking mode of the subject vehicle to the autonomous mode to the guidance information output unit 12. Alternatively or additionally, in the autonomous parking control unit 10 of the present embodiment, the second parking control may be set as a default control method, and the first parking control may be executed when the execution of the first parking control is instructed.

Next, an example of the parking assist method of the subject vehicle according to the parking assist device 100 will be explained using FIG. 2 to FIG. 4.

Figure 2:
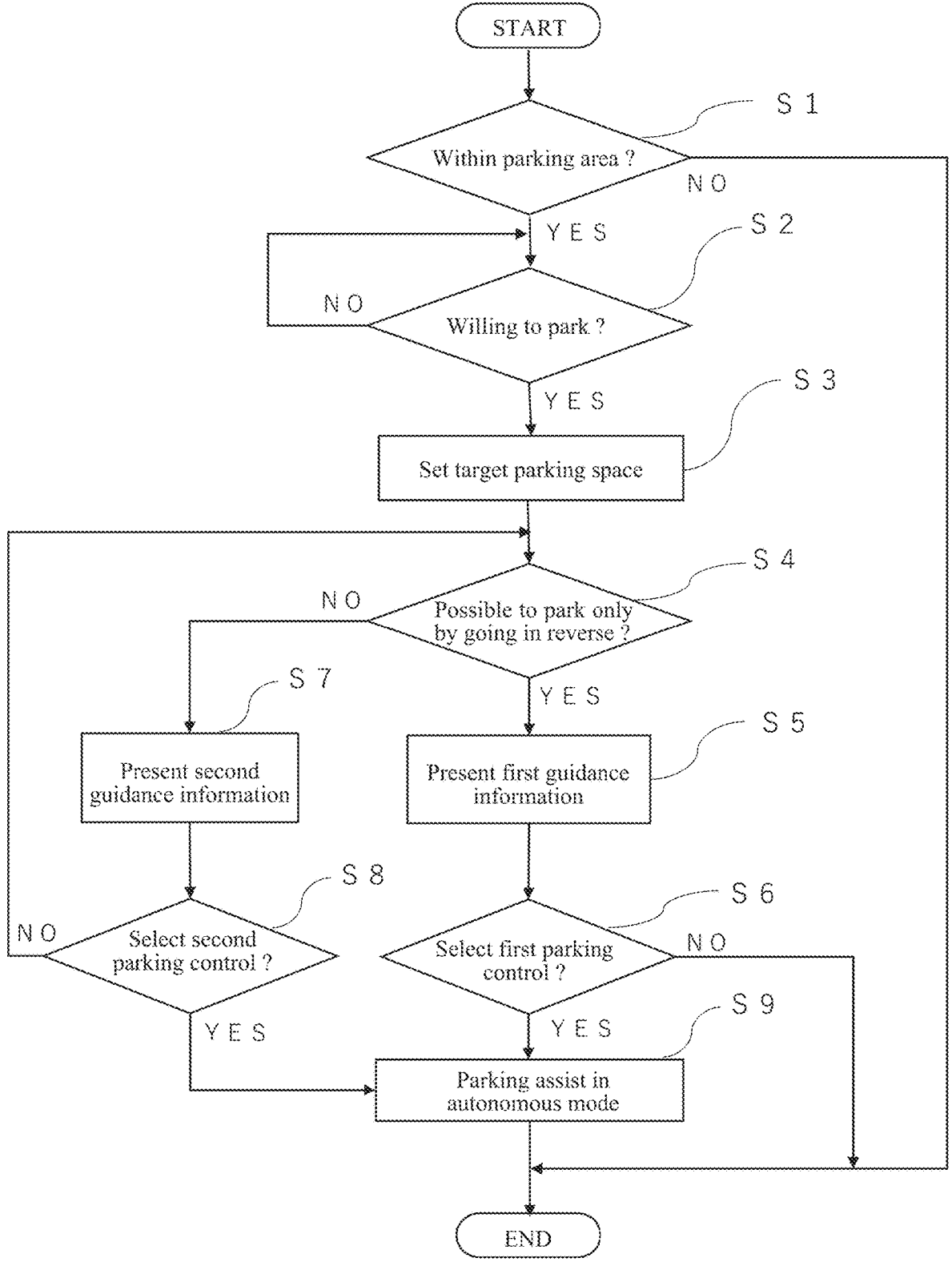
FIG. 2 is a flow chart illustrating the parking assist method according to the first embodiment of the present invention.

In step S1 illustrated in FIG. 2, the parking assist device 100 determines whether or not the subject vehicle V is in a parking area. The parking area is an area in which one or more of the parking slots are set. The parking assist device 100 can determine whether or not the subject vehicle V is in the parking area by referring to the current position estimated using the GPS unit of the current position estimation unit 3 and map information stored in advance. Alternatively or additionally, the parking assist device 100 may determine that the subject vehicle V is in the parking area when it is detected that other vehicles and/or the parking slots are aligned in the surroundings of the subject vehicle by using onboard sensors such as the cameras and the radars. When the subject vehicle V is not in the parking area, the process ends.

In place of step S1, when the vehicle speed becomes predetermined vehicle speed (e.g., 20 km/h) or less, the target parking slot detection unit 4 of the subject vehicle may be activated. When the target parking slot detection unit 4 is activated and the parking space in which the subject vehicle can be parked is detected around the subject vehicle, the process may proceed to step S2. When the parking space in which the subject vehicle can be parked is detected, the guidance information output unit 12 may display the parking space in which the subject vehicle can be parked in a particular form of display to teach the driver and the occupant that the parking space in which the subject vehicle can be parked exists. Alternatively or additionally, the guidance information output unit 12 may display the parking space that requires relatively shorter time for parking separately from the other parking spaces in which the subject vehicle can be parked in order to recommend the driver or the occupant to park the parking space that requires the relatively shorter time for parking.

In step S2, it is determined whether or not manual parking is executed by manual driving of the driver. Whether or not the manual parking is executed is determined by, for example, the parking assist device 100 estimating an intention of the driver when the parking mode of the subject vehicle V is the manual mode. As illustrated in FIG. 3, when the subject vehicle V is in the parking area PA, whether the driver performs turn of the steering wheel (the cutting of the wheel) by the manual driving at the current position G is determined on the basis of a trajectory R0 for moving the subject vehicle V, thereby, the intention to park in any of the parking spaces 31, 32, 33 is estimated, and it can be determined that the manual parking is executed. Alternatively or additionally, when it is detected that the driver performs an operation of changing gears on the basis of information of a gear position, the parking assist device 100 can estimate the intention to park of the driver and determine that the manual parking is executed. In the parking area PA, the determination of step S2 is executed at any time until it is determined that the intention to park of the driver is estimated.

Alternatively or additionally, the controller 15 may compare the actual trajectory for moving the subject vehicle V or the actual operation of changing gears (the information of the gear position) with the trajectory for moving or the operation of changing gears (the information of the gear position) when the subject vehicle V is autonomously parked. When an amount of the comparison is equal to or greater than a predetermined value, it is determined that the manual parking is executed.

Alternatively or additionally, the determination of step S1 and the determination of step S2 may be performed simultaneously.

When it is determined in step S2 that the intention to park of the driver is estimated, that is, when it is determined that the manual parking is executed, the process proceeds to step S3. In step S3, the target parking slot setting unit 1 of the parking assist device 100 sets the target parking space. The target parking space is defined inside the target parking slot detected by the target parking slot detection unit 4 including the onboard cameras, the sonars, the radars, and the like.

The target parking slot setting unit 1 sets the target parking space as the parking space in which the subject vehicle V can be parked with the least number of times of the cutting of the wheel. In the example illustrated in FIG. 3, the parking assist device 100 calculates the trajectories R1, R2, R3 for moving the subject vehicle V from the current position G to the parking space 31, 32, 33 respectively, assuming that the parking is completed by moving subject vehicle V to the parking space with one time of the cutting of the wheel. The number of times of the cutting of the wheel can be acquired from a shape of line of the calculated trajectories R1, R2, R3 for moving the subject vehicle V. Comparing the trajectories R1, R2, R3 for moving subject vehicle V, while it is difficult for the subject vehicle V to be parked in the parking space 32, 33 along the trajectories R2, R3 with one time of the cutting of the wheel from the current position G, there is no difficulty in parking the subject vehicle V in the parking space 31 along the trajectory R1 with one time of the cutting of the wheel. That is, while more than two times of the cutting of the wheel are required to park in the parking space 32, 33, one time of the cutting of the wheel is required to park in the parking space 31. Thus, the target parking slot setting unit 1 sets the parking space 31 as the target parking space.

Alternatively or additionally, the target parking slot setting unit 1 may set a threshold for the number of times of the cutting of the wheel and set the parking space that the number of the cutting of the wheel estimated to be executed until the subject vehicle V completes the parking is equal to or less than the threshold as the target parking space.

Alternatively or additionally, the target parking space may be set according to the selection of the driver among the plurality of parking spaces selected by the target parking slot setting unit 1.

After setting the target parking space in step S3, the process proceeds to step S4. The parking assist device 100 determines whether or not the subject vehicle V can be parked in the target parking space 31 by moving the subject vehicle V only backward. That is, when the subject vehicle V travels by the manual driving of the driver, the parking assist device 100 determines whether or not the subject vehicle V can be parked in the target parking space 31 from the current position by the first parking control. This determination is made on the basis of either a position or a direction of the target parking space 31 relative to the subject vehicle V or both of the position and the direction. When the position of the target parking space 31 deviates from a rear position of the subject vehicle V, it is determined that the subject vehicle V cannot be parked in the target parking space 31 by the first parking control. Alternatively or additionally, when an angle D0 of the direction of the target parking space 31 relative to the direction D1 of the subject vehicle V is equal to or greater than a predetermined angle, it is determined that the subject vehicle V cannot be parked in the target parking space 31 by the first parking control. Note that "when an angle D0 of the direction of the target parking space 31 relative to the direction D1 of the subject vehicle V is equal to or greater than a predetermined angle" refers to a state in which the direction D1 of the subject vehicle V at the current position and the direction D0 of the target parking space 31 are different from each other and the subject vehicle V cannot be moved to the target parking space 31 even when the subject vehicle V is moved backward with turning with the maximum amount of steering that the subject vehicle V can accept. As illustrated in FIG. 3, the direction D0 of the target parking space 31 is a direction along which the vehicle approaches or leaves the target parking space 31 when the vehicle parks or exits the target parking space 31.

In step S4, when it is determined that the subject vehicle V cannot be parked in the target parking space 31 by the first parking control, the process proceeds to step S7, and acceptance of the selection to execute the second parking control is enabled in the parking assist device 100. In step S7, the guidance information output unit 12 of the parking assist device 100 presents second guidance information indicating that the execution of the second parking control can be selected, as illustrated in the left side of FIG. 4. As illustrated in FIG. 4, a second control selection button 22 in green is displayed as the second guidance information at the lower right of the navigational screen of the guidance information output unit 12, thereby it is presented that the autonomous parking control unit 10 of the parking assist device 100 is in a state that the acceptance of the selection to execute the second parking control is enabled (a state that an input of command is being waited). In the navigational screen illustrated in FIG. 4, the parking space 31 selected as the target parking space for assisting the parking is highlighted.

The navigational screen illustrated in FIG. 4 is an image of the subject vehicle V captured from a virtual viewpoint above the subject vehicle V. Alternatively or additionally, the display as the guidance information output unit 12 may display an image captured with the back view camera or a wide area map together with the navigational screen as illustrated in FIG. 4, if necessary.

The process then proceeds from step S7 to step S8. In step S8, it is determined whether or not the driver presses the second control selection button 22 to select the second parking control. When the driver selects the second parking control, the process proceeds to step S9. In step S9, the parking assist device 100 executes the parking assist of the subject vehicle V with the autonomous mode by the second parking control. As illustrated in the left side of FIG. 4, the autonomous parking control unit 10 of the parking assist device 100 assists the parking of the subject vehicle V so that the subject vehicle V can be parked in the target parking space 31 along a route Rf for moving the subject vehicle V forward and a route Rb for moving the subject vehicle V backward. The parking route generation unit 5 of the controller 15 generates the route Rf for moving the subject vehicle forward and the route Rb for moving the subject vehicle backward relative to the target parking space 31, when the acceptance of the selection to execute the second parking control is enabled. Then, control for making the subject vehicle V travel along the routes Rf, Rb is executed, the route Rf being a route for moving the subject vehicle forward and the route Rb being a route for moving the subject vehicle backward. When it is determined that the subject vehicle V cannot be parked in the target parking space 31 by the first parking control, the controller 15 does not accept the selection to execute the first parking control.

The second control selection button 22 is configured as a deadman switch type button. Therefore, while the driver continues to press the second control selection button 22, a parking motion of the subject vehicle V with the autonomous mode is executed. When the driver releases his/her finger from the second control selection button 22, the parking motion of the subject vehicle V is stopped.

When the driver does not select the second parking control in step S8, the parking mode of the subject vehicle V is maintained in the manual mode, and the parking assist device 100 continues the determination in step S4.

On the other hand, in step S4, when it is determined that the subject vehicle V can be parked in the target parking space using the first parking control, the process proceeds to step S5, and the acceptance of the selection to execute the first parking control is enabled in the parking assist device 100. In step S5, the guidance information output unit 12 of the parking assist device 100 presents first guidance information indicating that the execution of the first parking control can be selected, as illustrated in the right side of FIG. 4. As illustrated in FIG. 4, a first control selection button 21 in blue is displayed as the first guidance information at the lower right of the navigational screen of the guidance information output unit 12. At the time that the parking by the first parking control is enabled as a result of the subject vehicle V being moved by the manual driving to the position at which the cutting of the wheel is performed relative to the target parking space 31, the form of display of the button in which "P" is marked as displayed in the lower right of the navigational screen is switched from green (the button for selecting and inputting the second parking control) to blue (the button for selecting and inputting the first parking control), thereby it is presented that the autonomous parking control unit 10 of the parking assist device 100 is in a state that the acceptance of the selection to execute the first parking control is enabled (the state that the input of command is being waited). As illustrated in the right side of FIG. 4, when it is determined that the subject vehicle V can be parked in the target parking space using the first parking control, only the first guidance information is presented as the guidance information, the first guidance information indicating that the execution of the first parking control can be selected. Thus, when the subject vehicle V can be parked in the target parking space using the first parking control, it is difficult for the driver to select the second parking control; and therefore, it is possible to suppress the parking time to be prolonged.

The process then proceeds from step S5 to step S6. In step S6, it is determined whether or not the driver presses the first control selection button 21 to select the first parking control. When the driver selects the first parking control, the process proceeds to step S9. In step S9, the parking assist device 100 executes the parking assist of the subject vehicle V with the autonomous mode by the first parking control. As illustrated in the right side of FIG. 4, the autonomous parking control unit 10 of the parking assist device 100 assists the parking of the subject vehicle V so that the subject vehicle V can be parked in the target parking space 31 with only the route Rb for moving the subject vehicle V backward. The parking route generation unit 5 of the controller 15 generates the route Rb for moving the subject vehicle backward relative to the target parking space 31, when the acceptance of the selection to execute the first parking control is enabled. Then, control for making the subject vehicle V travel along the route Rb is executed, the route Rb being a route for moving the subject vehicle backward.

The first control selection button 21 is the deadman switch type button in the same manner as the second control selection button 22. Therefore, while the driver continues to press the first control selection button 21, the parking motion of the subject vehicle V with the autonomous mode is executed. When the driver releases his/her finger from the first control selection button 21, the parking motion of the subject vehicle V is stopped.

As described above, in the parking assist device 100 and the parking assist method using the parking assist device 100 according to the present embodiment, when the parking determination unit 11 of the controller 15 determines that the subject vehicle V can be parked in the target parking space 31 by the first parking control, the autonomous parking control unit 10 becomes in a state that the acceptance of the selection to execute the first parking control is enabled. This allows the parking assist device 100 to execute the parking assist only for the parking motion to move the subject vehicle backward with reflecting the selection of the driver, even in the middle of the subject vehicle being parked in the manual mode.

The controller 15 of the parking assist device 100 executes the parking assist of the subject vehicle V by either first parking control for parking the subject vehicle V in the target parking space 31 by moving the subject vehicle V only backward or second parking control for parking the subject vehicle V in the target parking space 31 by moving the subject vehicle V forward and backward. This allows the parking assist device 100 to execute both the parking assist of the subject vehicle V by the first parking control and the parking assist of the subject vehicle V by the second parking control according to a situation of the subject vehicle V that is parked.

Figure 5:
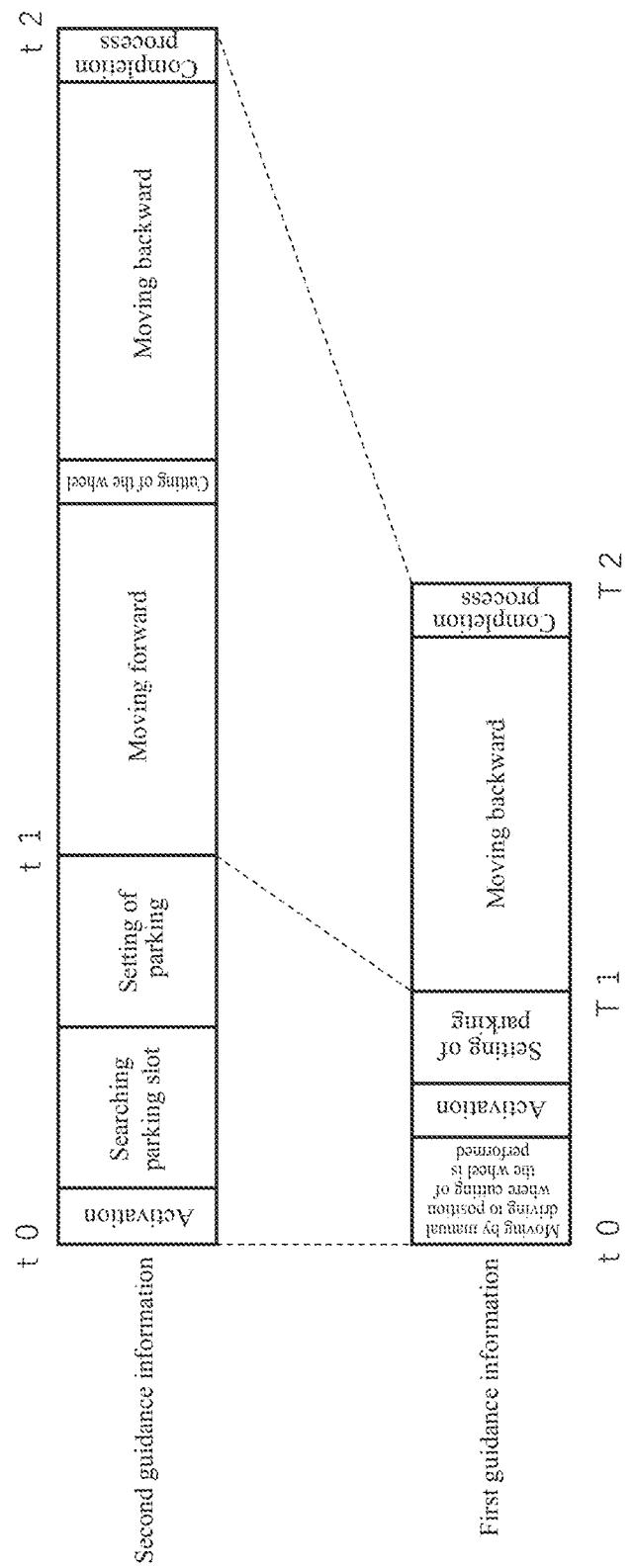
FIG. 5 is a diagram illustrating a graph comparing time for parking motions when executing the first parking control and time for parking motions when executing the second parking control.

A graph comparing time for parking motions when executing the second parking control and time for parking motions when executing the first parking control is illustrated in FIG. 5.

When the parking assist by the second parking control is executed, first, the autonomous parking control unit 10 of the parking assist device 100 is activated at time t0 at which the parking motion is started. Then, the parking slots around the subject vehicle are searched with the onboard sensors such as the cameras. Next, the target parking space is set, and setting of parking such as calculation of the parking route including the cutting of the wheel is performed. Time at which the setting of parking is completed is defined as time t1 at which the parking assist is started. After the time t1 at which the parking assist is started is elapsed, the autonomous parking control unit 10 of the parking assist device 100 executes an assist for moving the subject vehicle V forward, performing the cutting of the wheel, and moving the subject vehicle V backward. Lastly, the parking assist device 100 completes the parking motion at time t2 at which the parking motion is completed, after executing a completion process including confirmation that the subject vehicle V is stopped in the target parking space and a process of setting a shift position.

On the other hand, when executing the parking assist by the first parking control, at the time t0 at which the parking motion is started, first, the parking motion is started by the manual driving of the driver, and the subject vehicle V is moved forward in the manual mode until the subject vehicle V reaches the position at which the cutting of the wheel is performed. At the timing that the vehicle speed of the subject vehicle V becomes equal to or lower than the predetermined vehicle speed (e.g., 20 km/h), the detection of the parking slots around the subject vehicle V is started with the onboard sensors such as cameras. Then, the autonomous parking control unit 10 of the parking assist device 100 is activated at the position at which the cutting of the wheel is performed. The controller 15 of the parking assist device 100 searches the parking slots on the basis of a result of the detection of the parking slots and executes the setting of parking such as the setting of the target parking space and the setting of the parking route for moving the subject vehicle V backward. The time at which the setting of parking is completed is defined as time T1 at which the parking assist is started. Then, after the time T1 at which the parking assist is started is elapsed, the autonomous parking control unit 10 of the parking assist device 100 executes the parking assist for moving the subject vehicle V backward. After the completion process in the target parking space is executed, the parking motion is completed at time T2 at which the parking motion is completed.

Alternatively or additionally, when the parking assist by the first parking control is executed, first, the autonomous parking control unit 10 of the parking assist device 100 may be activated at time t0 at which the parking motion is started. Alternatively or additionally, the autonomous parking control unit 10 of the parking assist device 100 may be activated when the vehicle speed is the predetermined vehicle speed (e.g., 10 km/h). The parking slots around the subject vehicle are then searched with the onboard sensors such as the cameras. Next, the target parking space is set, and the calculation of the parking route including the cutting of the wheel and the like is performed. The parking motion is started by the manual driving of the driver, and the subject vehicle V is moved forward in the manual mode until the subject vehicle V reaches the position at which the cutting of the wheel is performed. Alternatively or additionally, it may be determined whether or not the subject vehicle travels along the calculated parking route on the basis of the motion of the subject vehicle and the operation being performed. Alternatively or additionally, it may be determined whether or not the parking motion is performed by the manual driving of the driver by determining a position of the subject vehicle relative to the parking route. When the subject vehicle V reaches the position at which the cutting of the wheel is performed, the assist for moving the subject vehicle V backward is executed, the completion process is executed in the target parking space, and then the parking motion is completed at the time T2 at which the parking motion is completed. Alternatively or additionally, when the subject vehicle V reaches the position at which the cutting of the wheel is performed, it may be determined that the subject vehicle V reaches the position at which the cutting of the wheel is performed on the basis of the movement, the operation, or the position of the vehicle, and the assist for moving the subject vehicle V backward may be started. Alternatively or additionally, when the occupant of the subject vehicle inputs a predetermined input or instruction to the vehicle, the assist for moving the subject vehicle V backward may be started.

Time from the time t0 at which the parking motion is started to the time T1 at which the parking assist is started when the first parking control is executed is shorter than time from the time t0 at which the parking motion is started to the time t1 at which the parking assist is started when the second parking control is executed. This is due to the following reasons (1) and (2).

(1) When the first parking control is executed, since the subject vehicle V is moved forward in the manual mode until the subject vehicle V reaches the position at which the cutting of the wheel is performed relative to the target parking space, time for searching the parking slots is not necessary.

(2) When the first parking control is executed, since the subject vehicle V has been moved to the position at which the cutting of the wheel is performed before starting the parking assist, time for the setting of parking is shortened.

Time from the time T1 at which the parking assist is started to the time T2 at which the parking motion is completed when the first parking control is executed is shorter than time from the time t1 at which the parking assist is started to the time t2 at which the parking motion is completed when the second parking control is executed. This is due to the following reason (3).

(3) When the first parking control is executed, the parking assist of the parking assist device 100 is not necessary for moving the subject vehicle forward and performing the cutting of the wheel.

Therefore, the time for parking motions when executing the first parking control (from the time t0 at which the parking motion is started to the time T2 at which the parking motion is completed) is shorter than the time for parking motions when executing the second parking control (from the time t0 at which the parking motion is started to the time t2 at which the parking motion is completed). The parking assist device 100 and the parking assist method using the parking assist device 100 according to the present embodiment can shorten the time required for the parking motion.

Alternatively or additionally, the controller 15 of the parking assist device 100 does not accept the selection to execute the first parking control when it is determined that the subject vehicle V cannot be parked in the target parking space 31 by the first parking control. This limits the selection to execute the first parking control when the subject vehicle V cannot be parked in the target parking space 31 by moving the subject vehicle V only backward. Thus, since the subject vehicle V is parked by moving the subject vehicle V forward and backward, certainty of executing the parking control can be improved.

Alternatively or additionally, the controller 15 of the parking assist device 100 determines whether or not the manual parking is executed. Then, when it is determined that the manual parking is executed, the controller 15 of the parking assist device 100 determines whether or not the subject vehicle V can be parked in the target parking space from the current position by the first parking control. This allows the parking assist device 100 to smoothly switch the parking mode of the subject vehicle V from the manual mode to the autonomous mode according to the selection of the driver and execute the parking assist of the subject vehicle V.

Alternatively or additionally, the controller 15 of the parking assist device 100 generates the route Rb for moving the subject vehicle backward relative to the target parking space 31, when the acceptance of the selection to execute the first parking control is enabled. Then, the controller 15 of the parking assist device 100 executes the control for making the subject vehicle V travel along the route Rb that is a route for moving the subject vehicle backward. This allows the parking assist device 100 to execute the first parking control more smoothly along the route Rb for moving the subject vehicle backward.

Alternatively or additionally, the display as the guidance information output unit 12 presents the first control selection button 21 to present the first guidance information indicating that the execution of the first parking control can be selected only when it is determined that the subject vehicle V can be parked in the target parking space 31 by the first parking control. This allows the driver to confirm whether or not the situations is a one in which the first parking control can be executed.

Alternatively or additionally, the display as the guidance information output unit 12 also displays the first control selection button 21 and the second control selection button 22 in different colors, the first control selection button 21 presenting that the first guidance information indicating that the execution of the first parking control can be selected and the second control selection button 22 presenting that the second guidance information indicating that the execution of the second parking control can be selected. This allows the driver to visually and intuitively confirm whether or not it is the situation in which the first parking control can be executed since the display color of the form of display of the button is switched according to the position of the subject vehicle V. Alternatively or additionally, the guidance information output unit 12 can also teach the driver the presence of the parking space in which the subject vehicle V can be parked by the second parking control by presenting the second guidance information indicating that the execution of the second parking control can be selected with differentiating the form of display of the second guidance information from that of the first guidance information, in the same manner as the first guidance information.

In the present embodiment, the first control selection button 21 is displayed in blue and the second control selection button 22 is displayed in green, but the colors are not limited thereto, and each of the first control selection button 21 and the second control selection button 22 may be displayed in different colors that can be distinguished.

Alternatively or additionally, the display as the guidance information output unit 12 presents the first control selection button 21 as the guidance information, the first control selection button 21 presenting the first guidance information, only when it is determined that the subject vehicle V can be parked in the target parking space 31 by the first parking control. This allows to prevent the execution of the first parking control from being selected due to an erroneous operation of the driver or the like, when it is determined that the subject vehicle V cannot be parked in the target parking space 31 by the first parking control.

For having the driver to visually and intuitively confirm whether or not the first parking control can be executed, the second guidance information and the first guidance information may be displayed in the forms of display different from each other with other methods. Alternatively or additionally, as illustrated in FIG. 6, the displayed position of the first control selection button 21 and the displayed position of the second control selection button 22 in the navigation screen may be different from each other. Alternatively or additionally, the shape, size, and pattern in the form of display of the first control selection button 21 may be different from the shape, size, and pattern in the form of display of the second control selection button 22. Alternatively or additionally, when the first parking control can be executed, the first control selection button 21 may be displayed in a blinking manner.

Figure 3:
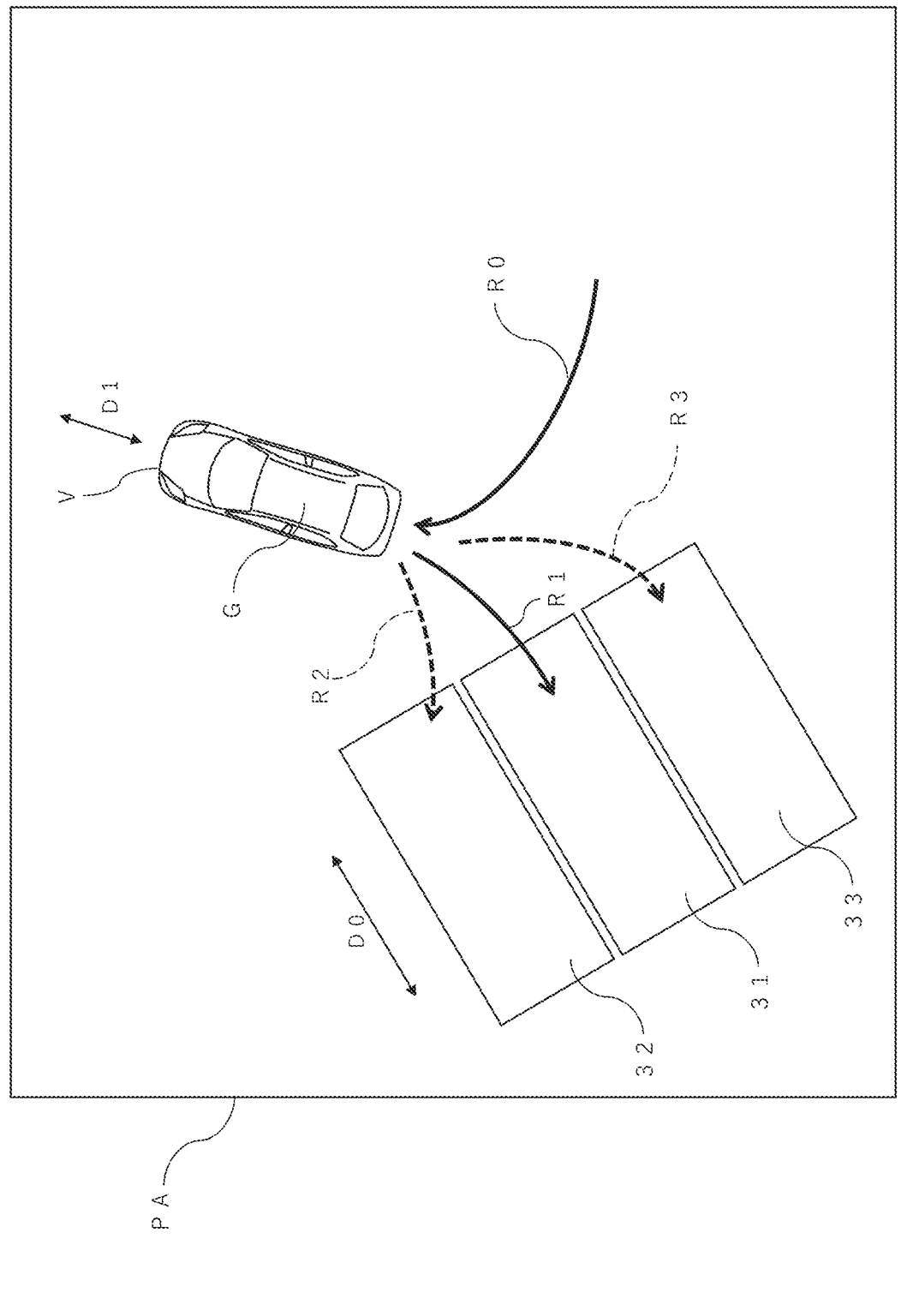
FIG. 3 is a diagram illustrating positional relations between the subject vehicle and the target parking space in the parking assist method illustrated in FIG. 2.

Alternatively or additionally, as illustrated in FIG. 3, the parking determination unit 11 determines whether or not the subject vehicle V can be parked in the target parking space from the current position G by the first parking control on the basis of either the position or the direction of the target parking space 31 relative to the subject vehicle V or both of the position and the direction. This allows the parking determination unit 11 to more appropriately determine the situation in which the execution of the first parking control can be selected.

Alternatively or additionally, the controller 15 of the parking assist device 100 estimates the intention of the driver to park the subject vehicle V on the basis of the trajectory for moving the subject vehicle V or the operation of changing gears (the information of the gear position) and determines that the manual parking is executed by the manual driving of the driver. When it is estimated that the driver intends to park the subject vehicle and determined that the manual parking is executed, the parking determination unit 11 determines whether or not the subject vehicle V can be parked in the target parking space from the current position by the first parking control. This allows the parking assist device 100 to efficiently determine whether the parking by the first parking control is permitted or not while reflecting the intention of the driver to park the subject vehicle.

In the present embodiment, the guidance information output unit 12 is not limited to the display for displaying the navigational screen and may be a speaker and the like for outputting the second guidance information and the first guidance information by voice. Alternatively or additionally, the selection to execute the first parking control or the second parking control may be input to the parking assist device 100 by voice recognition of the instruction uttered by the driver. This allows the driver to focus on the driving more since the driver does not have to touch the display to perform the operation when selecting the execution of the first parking control or the second parking control.

The first control selection button 21 and the second control selection button 22 are not limited to the deadman switch type button. Alternatively or additionally, the first parking control or the second parking control may be continuously executed once the driver touches the first control selection button 21 or the second control selection button 22. Alternatively or additionally, the first parking control or the second parking control may be stopped once the driver touches the first control selection button 21 or the second control selection button 22 again.

Alternatively or additionally, the guidance information output unit 12 may be a mobile terminal owned by the driver or the occupant. The driver may get off the subject vehicle V while the manual parking is performed and select the execution of the first parking control or the second parking control with a remote operation via an operation screen of the mobile terminal.

Alternatively or additionally, even in the case where it is determined that the subject vehicle V cannot be parked in the target parking space by moving the subject vehicle only backward, when the parking by the first parking control can be executed by moving the subject vehicle V forward by a predetermined distance, the guidance information output unit 12 may present an instruction for moving the subject vehicle V forward by the predetermined distance. The predetermined distance is a distance from several dozen centimeters to several meters. Additionally, when the instruction for moving the subject vehicle V forward is presented, the driver may move the vehicle forward by the manual driving or may instruct to execute the instruction for autonomously moving the vehicle forward under the control of the autonomous parking control unit 10. The guidance information output unit 12 presents the instruction for moving the subject vehicle V forward, presents the first guidance information after moving the subject vehicle V forward, and accepts the instruction to execute the first parking control. Whether or not the subject vehicle V is moved forward can be determined on the basis of a change in the position and a change in the shift position.

In the present embodiment, the second guidance information is presented after it is determined that the parking by the first parking control is not possible in step S4, but the presentation of the second guidance information is not limited thereto. Alternatively or additionally, the second guidance information indicating that the execution of the second parking control, which is a default control method, can be selected may be presented after it is determined that the subject vehicle V is in the parking area in step S1, or after the intention of the driver to park is estimated in step S2.

Alternatively or additionally, when it is determined that the subject vehicle V can be parked in the target parking space using the first parking control in step S4 illustrated in FIG. 2, the controller 15 of the parking assist device 100 may store a determination result. The determination result with respect to the target parking space 31 is updated and stored at a predetermined cycle at each of a timing while the parking assist device 100 detects the target parking space 31, a timing at which the manual parking is executed, a timing at which the subject vehicle V is stopped at the position at which the cutting of the wheel is performed, and a timing at which the vehicle speed of the subject vehicle V becomes the low vehicle speed. After the determination result is stored, when the controller 15 determines that the parking control is started on the basis of the result of travel of the subject vehicle V, the acceptance of the selection of the driver to execute the first parking control is enabled. The process then proceeds to step S5. Note that "determining that the parking control is started on the basis of the result of travel of the subject vehicle" refers to determining that the parking assist in the autonomous mode is started on the basis of the position and the condition of the subject vehicle V at the position at which the cutting of the wheel is performed, whether the parking control start switch is turned ON, and the like.

This allows the parking assist device 100 to execute the first parking control using the stored determination result immediately after accepting the selection by the driver to execute the first parking control, thereby the time required for the parking can be further shortened.

Alternatively or additionally, after it is determined that the subject vehicle V cannot be parked in the target parking space 31 by the first parking control in step S4 illustrated in FIG. 2, the controller 15 of the parking assist device 100 may further determine whether or not the subject vehicle V can be parked in the target parking space 31 from the current position by the second parking control. When it is determined that the subject vehicle V can be parked in the target parking space 31 by the second parking control, the acceptance of the selection to execute the second parking control is enabled. When the acceptance of the selection to execute the second parking control is enabled, the parking route generation unit 5 generates the route Rf for moving the subject vehicle V forward relative to the target parking space 31 and the route Rb for moving the subject vehicle V backward relative to the target parking space 31. The controller 15 executes the control for making the subject vehicle V travel along the routes Rf, Rb, the route Rf being a route for moving the subject vehicle forward and the route Rb being a route for moving the subject vehicle backward. This allows the parking assist device 100 to assist the parking of the subject vehicle V appropriately by the second parking control even when the subject vehicle V cannot be parked in the target parking space 31 by the first parking control.

It is not limited to the driver to select the execution of the first parking control or the second parking control, and it may be the occupant in the subject vehicle V. Alternatively or additionally, the selection to execute the first parking control or the second parking control may be made by the remote operation of a user outside the vehicle.

Second Embodiment

The parking assist method according to the second embodiment of the present invention will be described on the basis of FIG. 7 and FIG. 8.

Hereinafter, with respect to the features and control steps having the same reference numerals as those illustrated in FIG. 1 to FIG. 6, since they have the same or similar characteristics, detailed descriptions thereof will be omitted.

Figure 7:
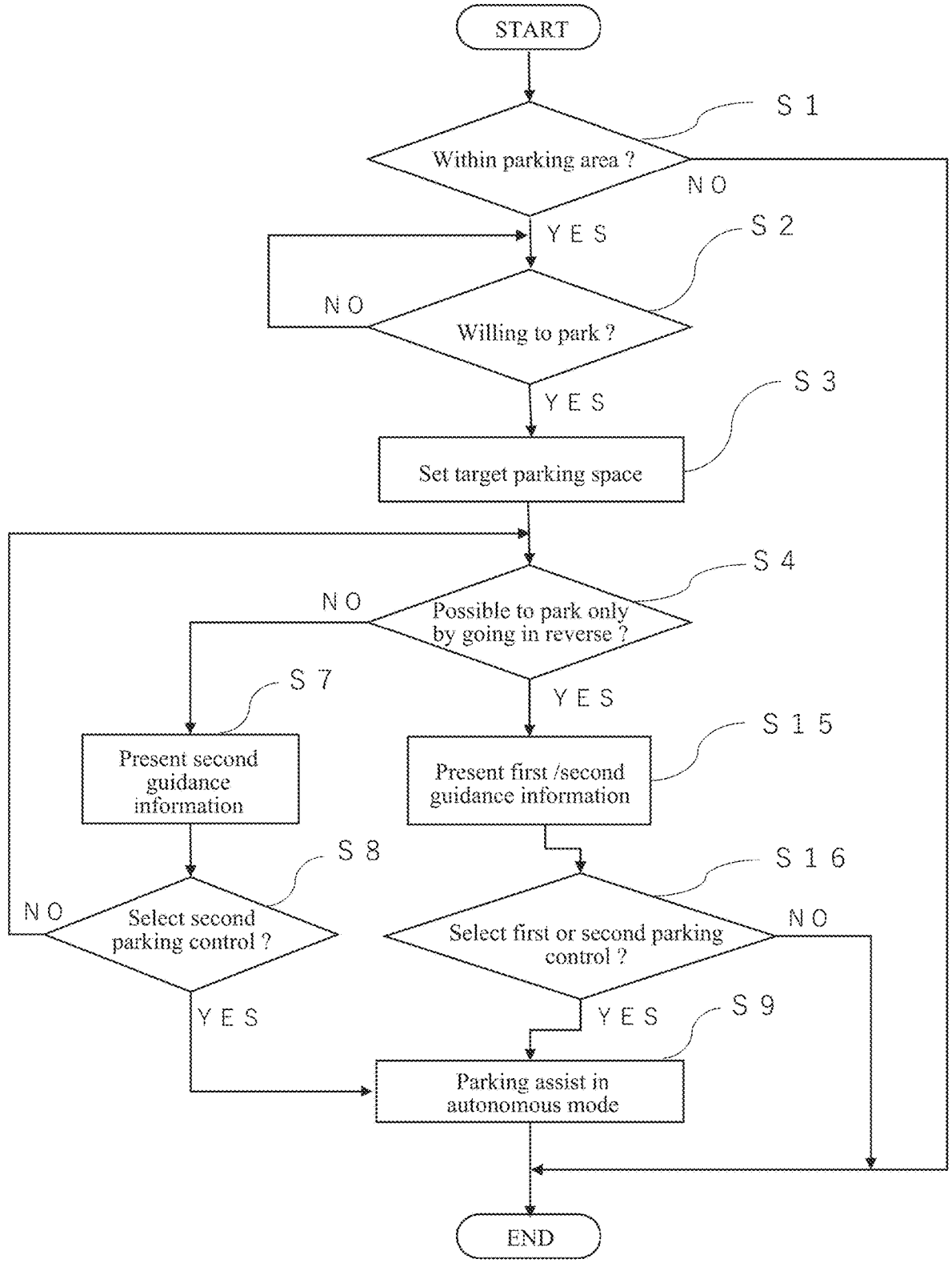
FIG. 7 is a flow chart illustrating the parking assist method according to the second embodiment of the present invention.

As illustrated in FIG. 7, in step S4, when it is determined that the subject vehicle V can be parked in the target parking space by the first parking control, the process proceeds to step S15. In step S15, the guidance information output unit 12 of the parking assist device 100 presents the guidance information indicating that either the execution of the second parking control or the execution of the first parking control can be selected, as illustrated in the right side of FIG. 8. When it is determined that the subject vehicle V can be parked in the target parking space by the first parking control, the guidance information output unit 12 presents both the first guidance information and the second guidance information as the guidance information. As illustrated in FIG. 8, the guidance information output unit 12 displays the first control selection button 21 and the second control selection button 22 that are lined one above the other in the lower right of the navigational screen.

Next, the process proceeds from step S15 to step S16. In step S16, it is determined whether the driver presses the first control selection button 21 to select the first parking control or the second control selection button 22 to select the second parking control. When the driver selects either the first parking control or the second parking control, the process proceeds to step S9. In step S9, the parking assist device 100 executes the parking assist of the subject vehicle V in the autonomous mode by the first parking control or second parking control selected by the driver. When the driver selects the first parking control in step S16, the autonomous parking control unit 10 executes to move the subject vehicle V only backward along the route Rb and park the subject vehicle V in the target parking space 31. When the driver selects the second parking control in step S16, the autonomous parking control unit 10 executes to move the subject vehicle V forward along the route Rf, then perform the cutting of the wheel and move it backward along the route Rb, and park the subject vehicle V in the target parking space 31.

Accordingly, in the parking assist method according to the present embodiment, when it is determined that the subject vehicle V can be parked in the target parking space by the first parking control, the guidance information output unit 12 presents both the first guidance information and the second guidance information as the guidance information, the first guidance information indicating that the execution of the first parking control can be selected and the second guidance information indicating that the execution of the second parking control can be selected, the second parking control being the control for parking the subject vehicle V in the target parking space 31 by moving the subject vehicle V forward and backward. This allows the driver to select the second parking control and the first parking control according to preferences of the driver or the driving situation when the parking mode is switched to the autonomous mode, even in the situation where the subject vehicle can be parked by moving the subject vehicle only backward, the second parking control being the control for assisting the subject vehicle to move forward and backward and the first parking control being the control for assisting the subject vehicle to move only backward and enabling to shorten the time for parking motion.

Third Embodiment

The parking assist method according to the third embodiment of the present invention will be described on the basis of FIG. 9 to FIG. 12.

Hereinafter, with respect to the features and control steps having the same reference numerals as those illustrated in FIG. 1 to FIG. 8, since they have the same or similar characteristics, detailed descriptions thereof will be omitted.

Figure 9:
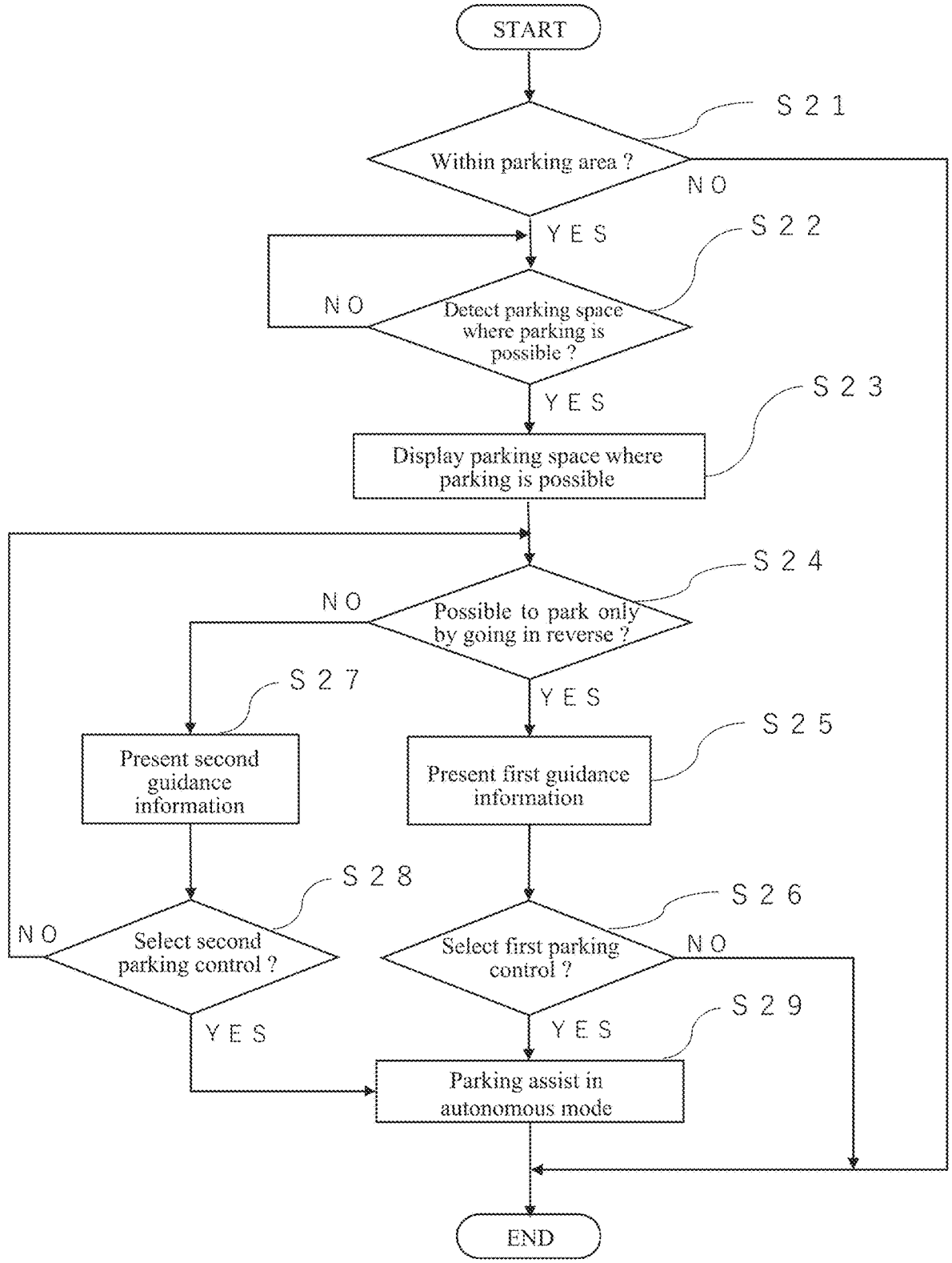
FIG. 9 is a flow chart illustrating the parking assist method according to the third embodiment of the present invention.

In step S21 illustrated in FIG. 9, the parking assist device 100 determines whether or not the subject vehicle V is in the parking area. The parking area is the area in which one or more of the parking slots are set. The parking assist device 100 can determine whether or not the subject vehicle V is in the parking area by referring to the current position estimated using the GPS unit of the current position estimation unit 3 and the map information stored in advance. Alternatively or additionally, the parking assist device 100 may determine that the subject vehicle V is in the parking area when it is detected that the other vehicles and/or the parking slots are aligned in the surroundings of the subject vehicle by using the onboard sensors such as the cameras and the radars. When the subject vehicle V is not in the parking area, the process ends. In place of step S21, when the vehicle speed becomes the predetermined vehicle speed (e.g., 20 km/h) or less, the target parking slot detection unit 4 of the subject vehicle may be activated.

In step S22, the target parking slot detection unit 4 is activated, and the detection of the parking space in which the subject vehicle can be parked existing around the subject vehicle is started. When the target parking slot detection unit 4 detects the parking space in which the subject vehicle can be parked, the process proceeds to step S23. When the target parking slot detection unit 4 does not detect the parking space in which the subject vehicle can be parked, the detection of the parking space in which the subject vehicle can be parked is continued. Alternatively or additionally, the determination of step S21 and the determination of step S22 may be performed simultaneously.

In step S22, when the parking space in which the subject vehicle can be parked is detected, the process proceeds to step S23. In step S23, the guidance information output unit 12 presents that the parking space in which the subject vehicle can be parked exists to the driver or the occupant. The guidance information output unit 12 displays the parking space in which the subject vehicle can be parked in the particular form of display. Alternatively or additionally, the guidance information output unit 12 may display the parking space that requires the relatively shorter time for parking separately from the other parking spaces in which the subject vehicle can be parked in order to recommend the driver or the occupant to park the parking space that requires the relatively shorter time for parking. The target parking space is selected and set from the parking spaces in which the subject vehicle can be parked. The target parking space may be selected by the driver on the basis of the information displayed on the guidance information output unit 12 or may be autonomously set by the parking assist device 100.

After step S23, the process proceeds to step S24. In step S24, the parking assist device 100 determines whether or not the subject vehicle can be parked in the target parking space by moving the subject vehicle V only backward. The parking assist device 100 determines whether or not the subject vehicle can be parked in the target parking space from the current position by the first parking control. This determination is made on the basis of either the position or the direction of the target parking space relative to the subject vehicle V or both of the position and the direction.

Figure 10:
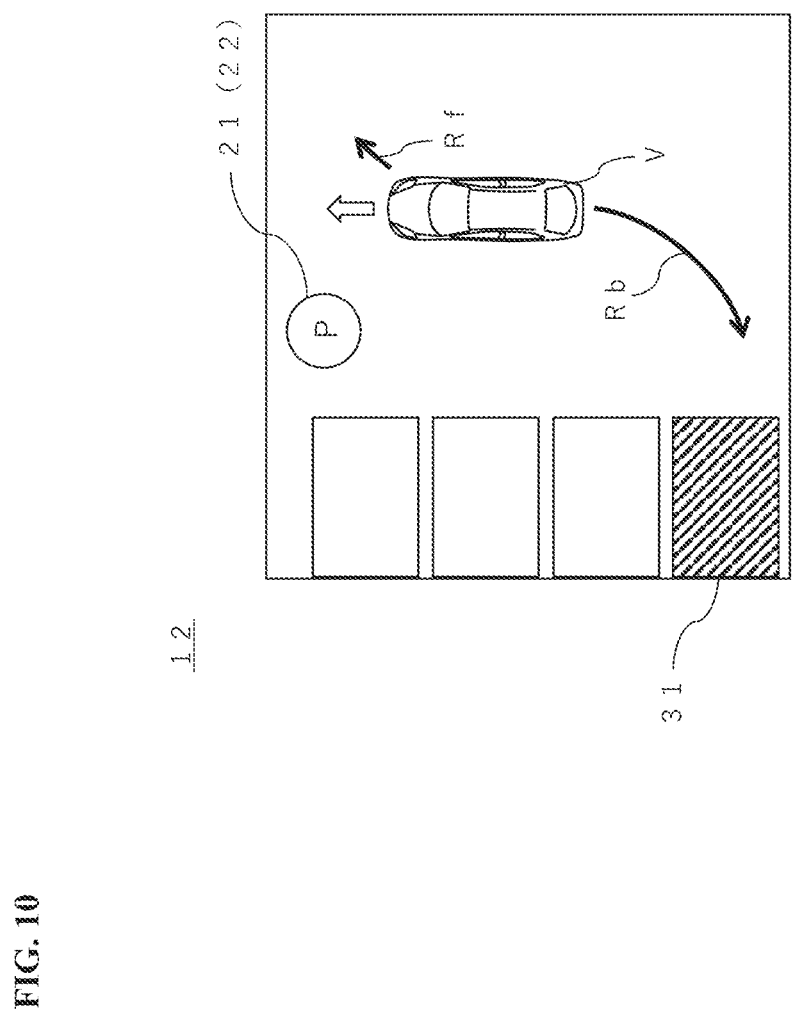
FIG. 10 is a diagram illustrating a form of display for presenting the first guidance information or the second guidance information on the screen when the subject vehicle is traveling in the parking assist method illustrated in FIG. 9.
Figure 11:
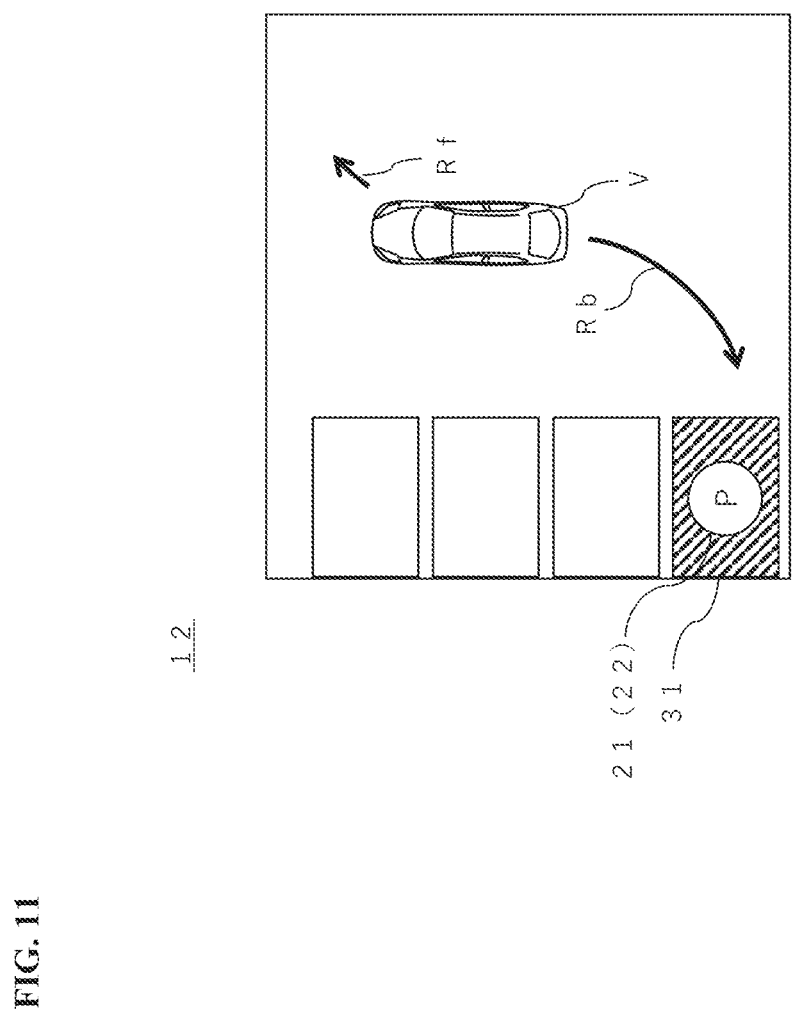
FIG. 11 is a diagram illustrating a form of display for presenting the first guidance information or the second guidance information on the screen when the subject vehicle is stopped in the parking assist method illustrated in FIG. 9.

In step S24, when it is determined that the subject vehicle V cannot be parked in the target parking space by the first parking control, the process proceeds to step S27. In step S27, the guidance information output unit 12 of the parking assist device 100 presents the second guidance information indicating that the execution of the second parking control can be selected on the navigational screen of the guidance information output unit 12. When it is determined that the subject vehicle V cannot be parked in the target parking space 31 by the first parking control, the controller 15 determines whether or not the subject vehicle V is stopped. According to the determination result of whether or not the subject vehicle V is stopped, the form of display of the second guidance information in the navigational screen of the guidance information output unit 12 is varied. When it is determined that the subject vehicle V is not stopped (i.e., when the subject vehicle V travels at low speed), as an image captured from the virtual viewpoint above the subject vehicle V as illustrated in FIG. 10, the second control selection button 22 in green is displayed as the second guidance information in the upper side of the navigation screen of the guidance information output unit 12. When it is determined that the subject vehicle is stopped, as illustrated in FIG. 11, the second control selection button 22 in green is presented as the second guidance information on the navigation screen of the guidance information output unit 12 at a position corresponding to the position of the target parking space 31 or superimposing on the target parking space 31. Thus, the second control selection button 22 is displayed on the area in which the target parking space 31 is displayed. This allows the guidance information output unit 12 to present to the occupant that the subject vehicle V cannot be parked in the target parking space 31 by the first parking control and that the execution of the second parking control can be selected, corresponding to whether or not the subject vehicle V is stopped.

Figure 12:
FIG. 12 is a diagram illustrating a form of display for presenting a detection situation of the parking space in which that subject vehicle can be parked and the first guidance information and the second guidance information on a navigational screen in the parking assist method illustrated in FIG. 9.

In another form of display in the navigational screen of the guidance information output unit 12 as illustrated in FIG. 12, a parking space detection button 23 in green indicating that the parking space is detected is displayed as the second guidance information on the map image. The parking space detection button 23 is displayed in green when the parking spaces in which the subject vehicle V can be parked are detected, and when it is determined that the subject vehicle V cannot be parked in any of the detected parking space by the first parking control. This allows to indicate that the execution of the first parking control cannot be selected, but the execution of the second parking control can be selected.

The process then proceeds from step S27 to step S28. In step S28, it is determined whether or not the driver presses the second control selection button 22 to select the second parking control. When the driver selects the second parking control, the process proceeds to step S29. In step S29, the parking assist device 100 executes the parking assist of the subject vehicle V with the autonomous mode by the second parking control. As arrows illustrated in FIG. 10 and FIG. 11, the autonomous parking control unit 10 of the parking assist device 100 assists the parking of the subject vehicle V so that the subject vehicle V can be parked in the target parking space 31 along the route Rf for moving the subject vehicle V forward and the route Rb for moving the subject vehicle V backward. Alternatively or additionally, the second control selection button 22 may be configured as the deadman switch type button. In this case, while the driver continues to press the second control selection button 22, the parking motion of the subject vehicle V with the autonomous mode is executed. When the driver releases his/her finger from the second control selection button 22, the parking motion of the subject vehicle V is stopped.

Alternatively or additionally, when the driver does not select the second parking control in step S28, the display in step S27 may be continued or the parking assist device 100 may continue the determination in step S24 while maintaining the parking mode of the subject vehicle V in the manual mode.

On the other hand, in step S24, when it is determined that the subject vehicle V can be parked in the target parking space using the first parking control, the process proceeds to step S25. In step S25, the guidance information output unit 12 of the parking assist device 100 presents the first guidance information indicating that the execution of the first parking control can be selected. When it is determined that the subject vehicle V can be parked in the target parking space 31 by the first parking control, the controller 15 determines whether or not the subject vehicle V is stopped. According to the determination result of whether or not the subject vehicle V is stopped, the form of display of the first guidance information in the navigational screen of the guidance information output unit 12 is varied. When it is determined that the subject vehicle V is not stopped (i.e., when the subject vehicle V travels at the low speed), as an image captured from the virtual viewpoint above the subject vehicle V as illustrated in FIG. 10, the first control selection button 21 in blue is displayed as the first guidance information in the upper side of the navigation screen of the guidance information output unit 12. When it is determined that the subject vehicle is stopped, as illustrated in FIG. 11, the first control selection button 21 in blue is presented as the first guidance information on the navigation screen of the guidance information output unit 12 at a position corresponding to the position of the target parking space 31 or superimposing on the target parking space 31. Thus, the first control selection button 21 is displayed at a position different from the area in which the target parking space 31 is displayed. This allows the guidance information output unit 12 to present to the occupant that the subject vehicle V can be parked in the target parking space 31 by the first parking control and that the execution of the first parking control can be selected, corresponding to whether or not the subject vehicle V is stopped.

In another form of display in the navigational screen of the guidance information output unit 12 as illustrated in FIG. 12, a parking space detection button 23 in blue indicating that the parking space is detected is displayed as the first guidance information on the map image. When the parking spaces in which the subject vehicle V can be parked are detected and when it is determined that the subject vehicle V can be parked in any of the detected parking space using the first parking control, the parking space detection button 23 is displayed in blue, not in green indicating the second guidance information. This allows to indicate that the execution of the first parking control can be selected.

Note that the colors displayed as the second guidance information and the first guidance information are not limited to green or blue as long as they are distinguishable colors.

The process then proceeds from step S25 to step S26. In step S26, it is determined whether or not the driver presses the first control selection button 21 to select the first parking control. When the driver selects the first parking control, the process proceeds to step S29. In step S29, the parking assist device 100 executes the parking assist of the subject vehicle V with the autonomous mode by the first parking control. As the arrow Rb illustrated in FIG. 10 and FIG. 11, the autonomous parking control unit 10 of the parking assist device 100 assists the parking of the subject vehicle V so that the subject vehicle V can be parked in the target parking space 31 with only the route Rb for moving the subject vehicle V backward. Alternatively or additionally, the first control selection button 21 may be the deadman switch type button in the same manner as the second control selection button 22. In this case, while the driver continues to press the first control selection button 21, a parking motion of the subject vehicle V with the autonomous mode is executed. When the driver releases his/her finger from the first control selection button 21, the parking motion of the subject vehicle V is stopped.

Accordingly, in the parking assist method according to the present embodiment, the controller 15 of the parking assist device 100 determines whether or not the subject vehicle V is stopped when it is determined that the subject vehicle V can be parked in the target parking space 31 by the first parking control. When it is determined that the subject vehicle V is not stopped, the display as the guidance information output unit 12 presents the first control selection button 21 presenting the first guidance information at the position different from the area in which the target parking space 31 is displayed. Thus, while the subject vehicle V is traveling, it is not necessary to superimpose the position of the target parking space 31 and the position of the first control selection button 21 on the navigation screen of the guidance information output unit 12. Even when the display of the navigation screen changes corresponding to the movement of the subject vehicle V, the first control selection button 21 is displayed on a predetermined position (the upper side of the screen) of the navigation screen (cf. FIG. 10) and is not affected by a deviation of position from the target parking space 31 due to a time lag. Therefore, the driver can readily recognize the first control selection button 21.

Alternatively or additionally, when it is determined that the subject vehicle V is stopped, the display as the guidance information output unit 12 presents the first control selection button 21 presenting the first guidance information on the area in which the target parking space 31 is displayed (cf. FIG. 11). In this manner, superimposing and displaying the target parking space 31 and the first control selection button 21 allows to present to the driver with more emphasis the position of the target parking space 31 and that the subject vehicle can be parked in the target parking space 31 by the first parking control. When the subject vehicle V is stopped, since the display of the navigational screen also does not change, there is no possibility that the deviation of position occurs between the target parking space 31 and the first control selection button 21 due to the time lag.

In the present embodiment, as described above, even when it is determined that the subject vehicle V cannot be parked in the target parking space 31 by the first parking control, it is determined whether or not the subject vehicle V is stopped, and the form of display of the second guidance information changes corresponding to the determination result. The present invention, however, is not limited thereto, and it may be determined whether or not the subject vehicle V is stopped only when it is determined that the subject vehicle V can be parked in the target parking space 31 by the first parking control, and only the first guidance information may be displayed corresponding to the determination result, as illustrated in FIG. 10 or FIG. 11.

The third embodiment can be executed with combining with the first or second embodiment. After presenting the second guidance information or the first guidance information in step S27 and step S25 of the third embodiment, the process may be executed in connection with step S2 illustrated in FIG. 2 or FIG. 7. When the second guidance information or the first guidance information as illustrate in FIG. 4 or FIG. 6 is displayed on the navigation screen, the guidance information as illustrated in FIG. 11 and the guidance information as illustrated in FIG. 12 that are displayed so far may also remain displayed. Alternatively, the guidance information as illustrated in FIG. 11 or the guidance information as illustrated in FIG. 12 may be deleted, and the second guidance information or the first guidance information as illustrated in FIG. 4 or FIG. 6 may be displayed on the navigational screen of the guidance information output unit 12.

The displays of the first control selection button 21 and the second control selection button 22 on the navigational screen of the guidance information output unit 12 are not limited to those illustrated in FIG. 4, FIG. 6, FIG. 8, FIG. 10, and FIG. 11. For example, while the parking motion of the subject vehicle V is executed, as illustrated in the right side of FIG. 8, the first control selection button 21 and the second control selection button 22 may be constantly displayed, and the first control selection button 21 may be operable only when the acceptance of the selection to execute the first parking control is enabled.

Description of Reference Numerals

100 . . . Parking assist device
10 . . . Autonomous parking control unit
11 . . . Parking determination unit
12 . . . Guidance information output unit (display)
15 . . . Controller
21 . . . First control selection button (First guidance information)
22 . . . Second control selection button (Second guidance information)
23 . . . Parking space detection button (First guidance information, Second guidance information)
31 . . . Target parking space
V . . . Subject vehicle
Rb . . . Route for moving backward
Rf . . . Route for moving forward

The invention claimed is:

1. A parking assist method using a parking assist device comprising a controller for executing parking assist to park a subject vehicle in a parking space as a target, comprising:
    detecting the parking space in which the subject vehicle can be parked;
    when the subject vehicle is moved by manual driving, determining whether or not the parking space in which the subject vehicle can be parked by a first parking control for parking the subject vehicle by moving the subject vehicle only backward exists in the detected parking space on a basis of a current position of the subject vehicle in motion;
    when it is determined that the parking space in which the subject vehicle can be parked by the first parking control exists, presenting that acceptance of a selection to execute the first parking control is enabled to an occupant; and
    when it is determined that the parking space in which the subject vehicle can be parked by the first parking control does not exist, presenting that acceptance of a selection to execute a second parking control for parking the subject vehicle in the parking space by moving the subject vehicle forward and backward is enabled to the occupant.

2. The parking assist method according to claim 1, the parking assist device comprising the controller for executing the parking assist of the subject vehicle by either the first parking control for parking the subject vehicle in the parking space by moving the subject vehicle only backward or the second parking control for parking the subject vehicle in the parking space by moving the subject vehicle forward and backward, the parking assist method comprising:
    when the subject vehicle is moved by the manual driving, determining whether or not the parking space in which the subject vehicle can be parked by the first parking control exists on the basis of the current position of the subject vehicle in motion; and
    when it is determined that the parking space in which the subject vehicle can be parked by the first parking control exists, enabling the acceptance of the selection to execute the first parking control from the occupant.

3. The parking assist method according to claim 1, comprising:
    not accepting the selection to execute the first parking control when it is determined that the parking space in which the subject vehicle can be parked by the first parking control does not exist on the basis of the current position of the subject vehicle in motion.

4. The parking assist method according to claim 1, comprising:
    determining whether or not the parking space in which the subject vehicle can be parked by the first parking control exists on the basis of the current position of the subject vehicle in motion;
    when it is determined that the parking space in which the subject vehicle can be parked by the first parking control exists, storing a determination result; and
    when it is determined that parking control is started on a basis of a result of travel of the subject vehicle after storing the determination result, enabling the acceptance of the selection to execute the first parking control.

5. The parking assist method according to claim 1, comprising:
    determining whether or not manual parking is executed; and
    when it is determined that the manual parking is executed, determining whether or not the parking space in which the subject vehicle can be parked by the first parking control exists on the basis of the current position of the subject vehicle in motion.

6. The parking assist method according to claim 1, comprising:
    when the acceptance of the selection to execute the first parking control is enabled, executing the first parking control by which the subject vehicle travels along a route set for moving the subject vehicle backward in response to the selection to execute the first parking control by the occupant.

7. The parking assist method according to claim 1, comprising:
    when the subject vehicle is moved by the manual driving, determining whether or not the parking space in which the subject vehicle can be parked by the second parking control for parking the subject vehicle by moving the subject vehicle forward and backward exists on the basis of the current position of the subject vehicle in motion;
    when it is determined that the parking space in which the subject vehicle can be parked by the second parking control exists, enabling the acceptance of the selection to execute the second parking control from the occupant;
    when the acceptance of the selection to execute the second parking control is enabled, executing the second parking control by which the subject vehicle travels along a route set for moving the subject vehicle forward and backward in response to the selection to execute the second parking control by the occupant.

8. The parking assist method according to claim 1, wherein the parking assist device comprises a display for presenting guidance information to an occupant of the subject vehicle, and only when it is determined that the parking space in which the subject vehicle can be parked by the first parking control exists on the basis of the current position of the subject vehicle in motion, the display presents first guidance information as the guidance information, the first guidance information indicating that execution of the first parking control can be selected.

9. The parking assist method according to claim 1, wherein the parking assist device comprises a display for presenting guidance information to an occupant of the subject vehicle, and when it is determined that the parking space in which the subject vehicle can be parked by the first parking control exists on the basis of the current position of the subject vehicle in motion, the display presents both first guidance information and second guidance information as the guidance information, the first guidance information indicating that execution of the first parking control can be selected and the second guidance information indicating that execution of the second parking control can be selected, the second parking control being control for parking the subject vehicle in the parking space by moving the subject vehicle forward and backward.

10. The parking assist method according to claim 1, wherein the parking assist device comprises a display for presenting guidance information to an occupant of the subject vehicle, and when it is determined that the parking space in which the subject vehicle can be parked by the first parking control does not exist on the basis of the current position of the subject vehicle in motion, the display presents second guidance information with a form of display other than first guidance information, the first guidance information indicating that execution of the first parking control can be selected and the second guidance information indicating that execution of the second parking control can be selected, the second parking control being control for parking the subject vehicle in the parking space by moving the subject vehicle forward and backward.

11. The parking assist method according to claim 8, comprising:

when it is determined that the parking space in which the subject vehicle can be parked by the first parking control exists on the basis of the current position of the subject vehicle in motion, presenting the first guidance information with the display, the first guidance information indicating that the execution of the first parking control can be selected;

when it is determined that the parking space in which the subject vehicle can be parked by the first parking control does not exist on the basis of the current position of the subject vehicle in motion, presenting second guidance information with the display, the second guidance information indicating that execution of the second parking control can be selected, the second parking control being control for parking the subject vehicle in the parking space by moving the subject vehicle forward and backward; and displaying the first guidance information and the second guidance information in a form of display different from each other.

12. The parking assist method according to claim 11, comprising:

displaying the first guidance information and the second guidance information in the forms of display different in color from each other.

13. The parking assist method according to claim 11, comprising:

displaying the first guidance information and the second guidance information in the forms of display different in a position in the display from each other.

14. The parking assist method according to claim 8, comprising:

when it is determined that the parking space in which the subject vehicle can be parked by the first parking control exists on the basis of the current position of the subject vehicle in motion, determining whether or not the subject vehicle is stopped, and when it is determined that the subject vehicle is not stopped, presenting the first guidance information with the display in a position that is different from an area in which the parking space in which the subject vehicle can be parked by the first parking control is displayed.

15. The parking assist method according to claim 8, comprising:

when it is determined that the parking space in which the subject vehicle can be parked by the first parking control exists on the basis of the current position of the subject vehicle in motion, determining whether or not the subject vehicle is stopped, and when it is determined that the subject vehicle is stopped, presenting the first guidance information with the display in an area in which the parking space in which the subject vehicle can be parked by the first parking control is displayed.

16. The parking assist method according to claim 1, comprising:

determining whether or not the subject vehicle can be parked in the parking space by the first parking control on a basis of either a position or a direction of the parking space relative to the subject vehicle in motion or both of the position and the direction.

17. The parking assist method according to claim 1, comprising:

determining whether or not the subject vehicle in motion can be parked in the parking space by the first parking control when it is determined that manual parking is executed on a basis of a trajectory on which the subject vehicle moves.

18. The parking assist method according to claim 1, comprising:

determining whether or not the subject vehicle in motion can be parked in the parking space by the first parking control when it is determined that manual parking is executed on a basis of an operation of changing gears of the subject vehicle.

19. A parking assist device comprising a controller for executing parking assist to park a subject vehicle in a parking space as a target, wherein the controller is configured to:

detect the parking space in which the subject vehicle can be parked;

comprise a parking determination unit for determine whether or not the parking space in which the subject vehicle can be parked by a first parking control for parking the subject vehicle by moving the subject vehicle only backward exists in the detected parking space on a basis of a current position of the subject vehicle in motion, when the subject vehicle is moved by manual driving;

present that acceptance of a selection to execute the first parking control is enabled to an occupant, when the parking determination unit determines that the parking space in which the subject vehicle can be parked by the first parking control exists; and present that acceptance of a selection to execute a second parking control for parking the subject vehicle in the parking space by moving the subject vehicle forward and backward is enabled to the occupant when the parking determination unit determines that the parking space in which the subject vehicle can be parked by the first parking control does not exist.

20. The parking assist method according to claim 1, wherein the first parking control is control for controlling a steering actuator and an acceleration actuator of the subject vehicle by the controller so that the subject vehicle is parked in the parking space by moving the subject vehicle only backward.

21. The parking assist method according to claim 1, comprising:

when the subject vehicle is moved by the manual driving after an autonomous parking control unit for executing an autonomous parking function is activated, determining whether or not the parking space in which the subject vehicle can be parked by the first parking control exists on the basis of the current position of the subject vehicle in motion.

22. The parking assist method according to claim 1, comprising:

when the subject vehicle is moved by the manual driving after a target parking slot detection unit for detecting a parking slot of the parking space is activated, determining whether or not the parking space in which the subject vehicle can be parked by the first parking control exists on the basis of the current position of the subject vehicle in motion.

* * * * *